(12) United States Patent
Sato

(10) Patent No.: US 10,891,767 B2
(45) Date of Patent: Jan. 12, 2021

(54) IMAGE PROCESSING APPARATUS AND NON-TRANSITORY COMPUTER READABLE RECORDING MEDIUM FOR TRIANGLE-BASED PIXEL AREA CALCULATIONS TO PERFORM ANTI-ALIASING ON EDGES IN SCAN LINE CONVERSIONS

(71) Applicant: KYOCERA DOCUMENT SOLUTIONS INC., Osaka (JP)

(72) Inventor: Yasuhide Sato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/512,476

(22) Filed: Jul. 16, 2019

(65) Prior Publication Data

US 2020/0027255 A1    Jan. 23, 2020

(30) Foreign Application Priority Data

Jul. 17, 2018  (JP) .................................. 2018-134083

(51) Int. Cl.
*G06T 11/40* (2006.01)
*G06T 11/20* (2006.01)
*G06T 7/13* (2017.01)

(52) U.S. Cl.
CPC ............... *G06T 11/40* (2013.01); *G06T 7/13* (2017.01); *G06T 11/203* (2013.01)

(58) Field of Classification Search
None
See application file for complete search history.

(56) References Cited

U.S. PATENT DOCUMENTS 6,606,093 B1 * 8/2003 Gossett ................. G06T 11/203
345/4

FOREIGN PATENT DOCUMENTS

JP          H10-228537 A  *  8/1998

* cited by examiner

*Primary Examiner* — Patrick F Valdez
(74) *Attorney, Agent, or Firm* — Li & Cai Intellectual Property (USA) Office

(57) ABSTRACT

An image processing apparatus includes a controller circuit configured to calculate a number of multiple micro-triangles included in a region of each pixel of the multiple pixels, the region being covered by the right triangle, each micro-triangle of the multiple micro-triangles and the first micro-triangle being congruent, and calculate an area of the region of each pixel of the multiple pixels, the region being covered by the right triangle, on a basis of the number of the multiple micro-triangles and the area of the first micro-triangle.

5 Claims, 12 Drawing Sheets

| Pixel | 10A | 10B | 10C | 10D |
|-------|-----|-----|-----|-----|
| n | 3 | 7 | 1 | 13 |
| δ | 3 | 4 | 4 | 2 |
| Ci | 0.0865 | 0.385 | 0.692 | 0.462 |
| BCi | 22 | 98 | 176 | 117 |

FIG.3

- sub_unit is division into sub-pixels in x and y directions (2, 4, 8, 16)
- fix16_xxx is fixed-point of fractional part 16 bits
- squre_tbl[n] = n²
- subpx_shift[ ] is shift value for converting subpx_unit multiplication or division into shift operation
- num_of_subpx_shift[ ] is division shift value of number of sub-pixels in pixel
- Fix16ToInt(x) is conversion of fixed-point number into integer (x>>16)

```
AA_fix16(fix16_x0,fix16_x1, covers, sub_unit)
    # table definition
    squre_tbl = [0,1,4,9,16,25,36,49,64,81,100,121,144,169,196,225,256]
    #   sub_unit       2   4       8               16
    subpx_shift = [0,0,1,0,2,0,0,0,3,0,0,0,0,0,0,0,4]
    #   sub_unit       2   4       8               16
    num_of_subpx_shift = [0,0,2,0,4,0,0,0,6,0,0,0,0,0,0,0,8]
S101 ── ## convert into integer coordinates in sub-pixel system
        int_sub_x0 = fix16_x0 >> ( 16 - subpx_shift[sub_unit] )
        int_sub_x1 = fix16_x1 >> ( 16 - subpx_shift[sub_unit] )
S102 ── ## calculate pixels Run length
        pix_run = Fix16ToInt(fix16_x1 + 0xFFFF) - Fix16ToInt(fix16_x0)
        int_nxt_pix_sub = (Fix16ToInt(fix_x0) + 1) << subpx_shift[sub_unit]
        if pix_run == 1 then     ## Run length = 1? ──── S103
S104 ── ##calculate coverage value of pixel based on trapezoid area
            fix16_covr_sub = (2*int_nxt_pix_sub - int_sub_x0 - int_sub_x1) << (subpx_shift[sub_unit] + 15)
            fix16_act_covr = ((fix16_covr_sub << 8 ) - fix16_covr_sub ) >> num_of_sub_shift[sub_unit]
            covers[0] = Fix16ToInt(fix16_act_covr)
            return
        end
        # run >= 2
S105 ── ## calculate area of micro-triangle
        fix16_mcro_tr_sub = (sub_unit << 15)/(int_sub_x0 - int_sub_x0)
S106 ── fix16_mcro_tr = ((fix16_mcro_tr_sub << 8 ) - fix16_mcro_tr_sub ) >> num_of_sub_shift[sub_unit]
        ## number of micro-triangles in primary pixel
S107 ── ## calculate coverage value of primary pixel(coverage value 0-255)
        m = int_nxt_pix_sub - int_sub_x0
        fix16_act_covr = square_tbl[m] * fix16_mcro_tr
        covers[0] = Fix16ToInt(fix16_act_covr)
        idx = 1
S108 ── ## calculate coverage value differential amount Δ
        fix16_delta_covr = (fix16_mcro_tr_sub << 9) - (fix16_mcro_tr_sub << 1 )
S109 ── ## correct coverage value of primary pixel for adjacent pixel
        fix16_act_covr -= (square_tbl[( sub_unit - m )] * fix16_mcro_tr )
        while((run - 1) > idx ){  ## end pixel? ──── S110
            fix16_act_covr += fix16_delta_covr        ## add Δ to previous pixel ──── S111
            covers[idx++] = Fix16ToInt(fix16_act_covr) ## calculate coverage value of pixel ──── S112
        }
S113 ── ## add Δ to coverage value of previous pixel (end pixel processing)
        fix16_act_covr += fix16_delta_covr
S114 ── ## correct coverage value of end pixel
        int_nxt_pix_sub = (Fix16ToInt(x1) + 1) << subpx_shift[sub_unit]
        n = int_nxt_pix_sub - int_sub_x1
        fix16_act_covr -= (square_tbl[( sub_unit - n )] * fix16_mcro_tr )
S115 ── ## calculate coverage value of end pixel
        covers[idx] = Fix16ToInt(fix16_act_covr)
        return
```

FIG.4

IMAGE PROCESSING APPARATUS AND NON-TRANSITORY COMPUTER READABLE RECORDING MEDIUM FOR TRIANGLE-BASED PIXEL AREA CALCULATIONS TO PERFORM ANTI-ALIASING ON EDGES IN SCAN LINE CONVERSIONS

CROSS REFERENCE TO RELATED APPLICATION

This application claims the benefit of Japanese Priority Patent Application JP 2018-134083 filed Jul. 17, 2018, the entire contents of which are incorporated herein by reference.

BACKGROUND OF THE INVENTION

1. Field of the Invention

The present disclosure relates to an image processing apparatus configured to calculate areas of pixels in order to execute anti-aliasing on jaggies that occur on edges of an image in scan line conversion. The present disclosure further relates to a non-transitory computer readable recording medium that stores an image processing program.

2. Description of Related Art

There is known an art for calculating areas of pixels in order to execute anti-aliasing on jaggies that occur on edges of an image in scan line conversion.

SUMMARY OF THE INVENTION

When areas of pixels are calculated in order to execute anti-aliasing on jaggies that occur on edges of an image in scan line conversion, it is desirable to calculate the areas at a high speed.

According to an embodiment of the present disclosure, there is provided an image processing apparatus, including:

a controller circuit configured to detect a first point in a pixel group, the pixel group including multiple rectangular pixels arrayed in one line in series in a scan line direction, each pixel of the multiple pixels being divided into multiple rectangular sub-pixels, the multiple rectangular sub-pixels being arranged in matrix in the scan line direction and in a perpendicular direction, the perpendicular direction being a direction perpendicular to the scan line direction, a lower side and an upper side of the pixel group being in parallel with the scan line direction, the first point being a point on which the lower side of the pixel group and an edge line cross each other, the edge line being a line indicating an edge of an image-to-be-rendered, detect a second point, the second point being a point on which the upper side of the pixel group and the edge line cross each other, select a first vertex, the first vertex being one vertex of two vertices positioned on a lower side of a first sub-pixel, the first sub-pixel being a sub-pixel including the first point out of the multiple sub-pixels, select a second vertex, the second vertex being one vertex of two vertices positioned on an upper side of a second sub-pixel, the second sub-pixel being a sub-pixel including the second point out of the multiple sub-pixels, create a right triangle, the right triangle including the image, the right triangle having a hypotenuse and a first cathetus, the hypotenuse being a line segment from the first vertex to the second vertex, the first cathetus being the upper side or the lower side of the pixel group, calculate an area of a first micro-triangle, the first micro-triangle being included in the first sub-pixel or the second sub-pixel, the first micro-triangle including the image, the image having a hypotenuse, one cathetus, and one other cathetus, the hypotenuse being the line segment, the one cathetus being the first cathetus of the right triangle, the one other cathetus being one side of the first sub-pixel or the second sub-pixel, the first micro-triangle and the right triangle having a geometrical similarity, calculate a number of multiple micro-triangles included in a region of each pixel of the multiple pixels, the region being covered by the right triangle, each micro-triangle of the multiple micro-triangles and the first micro-triangle being congruent, and calculate an area of the region of each pixel of the multiple pixels, the region being covered by the right triangle, on a basis of the number of the multiple micro-triangles and the area of the first micro-triangle.

According to an embodiment of the present disclosure, there is provided a non-transitory computer readable recording medium that stores an image processing program, the image processing program causing a controller circuit of an image processing apparatus to:

detect a first point in a pixel group, the pixel group including multiple rectangular pixels arrayed in one line in series in a scan line direction, each pixel of the multiple pixels being divided into multiple rectangular sub-pixels, the multiple rectangular sub-pixels being arranged in matrix in the scan line direction and in a perpendicular direction, the perpendicular direction being a direction perpendicular to the scan line direction, a lower side and an upper side of the pixel group being in parallel with the scan line direction, the first point being a point on which the lower side of the pixel group and an edge line cross each other, the edge line being a line indicating an edge of an image-to-be-rendered;

detect a second point, the second point being a point on which the upper side of the pixel group and the edge line cross each other;

select a first vertex, the first vertex being one vertex of two vertices positioned on a lower side of a first sub-pixel, the first sub-pixel being a sub-pixel including the first point out of the multiple sub-pixels;

select a second vertex, the second vertex being one vertex of two vertices positioned on an upper side of a second sub-pixel, the second sub-pixel being a sub-pixel including the second point out of the multiple sub-pixels;

create a right triangle, the right triangle including the image, the right triangle having a hypotenuse and a first cathetus, the hypotenuse being a line segment from the first vertex to the second vertex, the first cathetus being the upper side or the lower side of the pixel group;

calculate an area of a first micro-triangle, the first micro-triangle being included in the first sub-pixel or the second sub-pixel, the first micro-triangle including the image, the image having a hypotenuse, one cathetus, and one other cathetus, the hypotenuse being the line segment, the one cathetus being the first cathetus of the right triangle, the one other cathetus being one side of the first sub-pixel or the second sub-pixel, the first micro-triangle and the right triangle having a geometrical similarity;

calculate a number of multiple micro-triangles included in a region of each pixel of the multiple pixels, the region being covered by the right triangle, each micro-triangle of the multiple micro-triangles and the first micro-triangle being congruent; and calculate an area of the region of each pixel of the multiple pixels, the region being covered by the right triangle, on a basis of the number of the multiple micro-triangles and the area of the first micro-triangle.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows the area of the multiple micro-triangles included in each pixel, and the byte data value thereof;

FIG. 4 shows a code example of fixed-point arithmetic actual implementation as an actual implementation example;

DETAILED DESCRIPTION OF THE PREFERRED EMBODIMENTS

Hereinafter, an embodiment of the present disclosure will be described with reference to the drawings.

1. Overview of Anti-Aliasing

Typically, an image display device displays an image with pixel units, each pixel being filled solid. In other words, an image display device cannot render an image more minutely than the pixel units. As a result, aliasing occurs. Jaggies that occur on edges of an image are an example of aliasing.

In the anti-aliasing processing of the scan line conversion, a color tone or lightness of a pixel, which includes an edge of an image, is made different from a color tone or lightness of a pixel, which includes the image but includes no edge, in order to make the jaggies unobtrusive. The color tone or lightness of a pixel, which includes an edge of an image, is determined on a basis of an area of an image that covers the pixel.

For example, if an area of an image that covers a pixel is larger than an area of the pixel other than the image (background), the difference between a color tone or lightness of the pixel, which includes an edge of the image, and a color tone or lightness of a pixel, which includes the image but includes no edge, is made smaller. To the contrary, if an area of an image that covers a pixel is smaller than an area of the pixel other than the image (background), the difference between a color tone or lightness of the pixel, which includes an edge of the image, and a color tone or lightness of a pixel, which includes the image but includes no edge, is made larger.

According to the present embodiment, when areas of pixels are calculated in order to execute anti-aliasing on jaggies that occur on edges of an image in scan line conversion, it is desirable to calculate the areas at a high speed.

2. Hardware Configuration of Image Processing Apparatus

Figure 1:
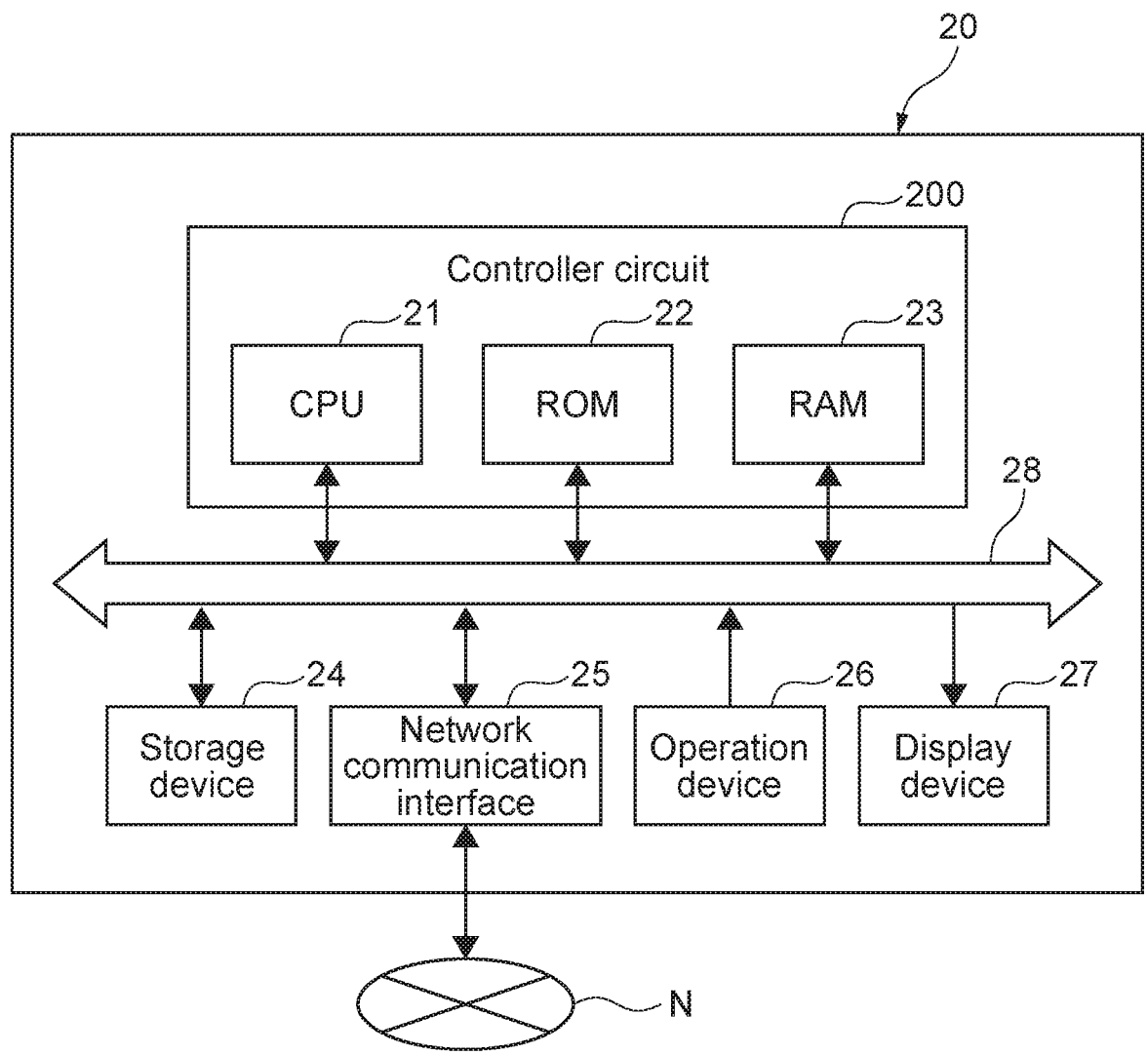
FIG. 1 shows a hardware configuration of an image processing apparatus.

FIG. 1 shows a hardware configuration of an image processing apparatus.

The image processing apparatus 20 includes the CPU 21, the ROM 22, the RAM 23, the storage device 24, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The nonvolatile ROM 22 stores information processing programs executed by the CPU 21 and data. The ROM 22 is an example of a non-transitory computer readable recording medium. The controller circuit 200 may further include a dedicated hardware circuit (not shown).

3. Overview of a Method of Calculating an Area of an Image that Covers a Pixel

Figure 2:
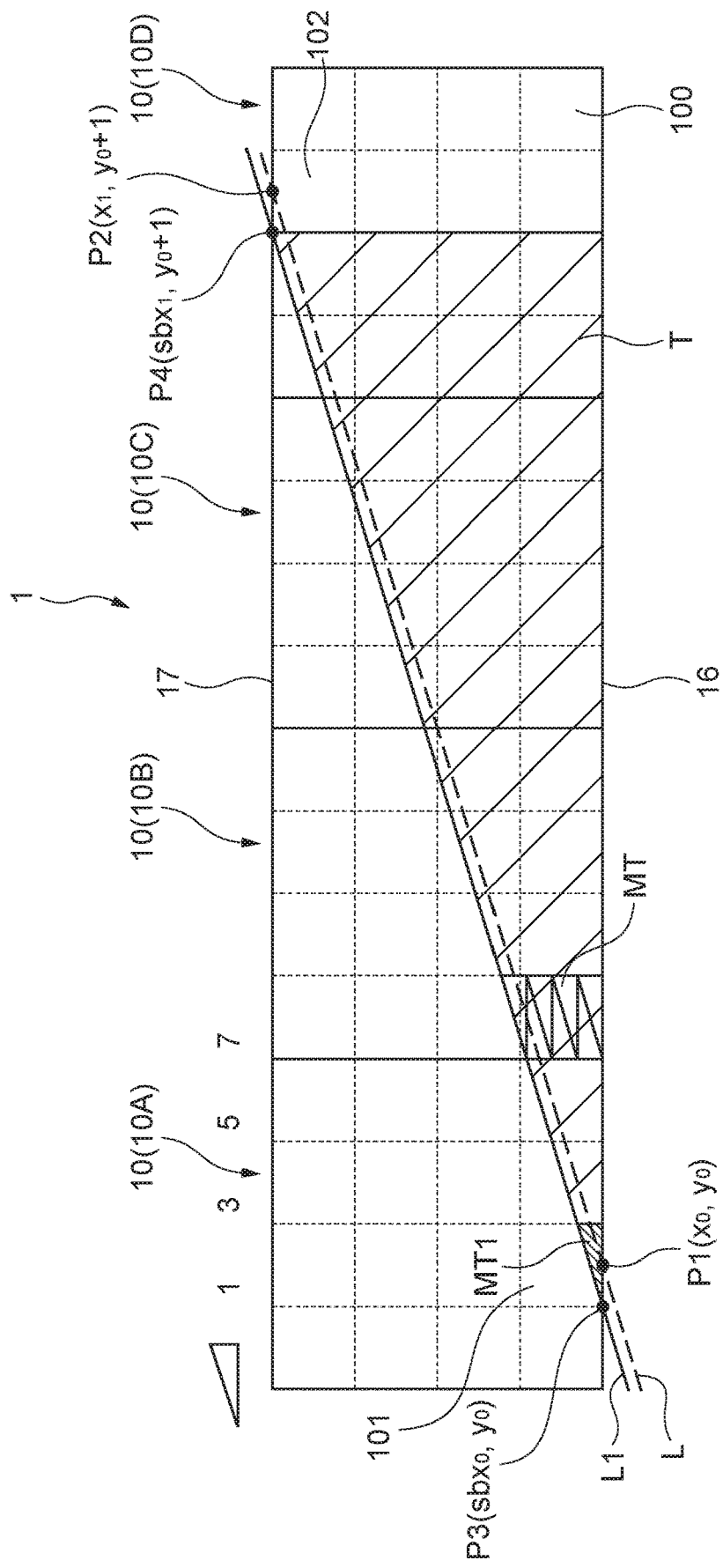
FIG. 2 schematically illustrates an overview of a method of calculating an area of an image that covers a pixel.

FIG. 2 schematically illustrates an overview of a method of calculating an area of an image that covers a pixel.

The pixel group 1 includes multiple (in this example, four) rectangular (in this example, square) pixels 10 (10A, 10B, 10C, and 10D) arrayed in one line in series in the scan line direction (X direction). The lower side 16 and the upper side 17 of the pixel group 1 are in parallel with the scan line direction (X direction).

The edge line L (dotted line of FIG. 2) is a line indicating an edge of an image-to-be-rendered. The edge line L and the lower side 16 of the pixel group 1 cross each other, and the edge line L and the upper side 17 of the pixel group 1 cross each other. The real number coordinates of the first point P1, on which the lower side 16 of the pixel group 1 and the edge line L cross each other, will be referred to as $(x_0, y_0)$. The real number coordinates of the second point P2, on which the upper side 17 of the pixel group 1 and the edge line L cross each other, will be referred to as $(x_1, y_0+1)$.

Each pixel 10 is divided into multiple (in this example, 4×4=16) rectangular (in this example, square) sub-pixels 100 arranged in matrix, the number of the sub-pixels 100 in the scan line direction (X direction) being "a" (in this example, a=4), the number of the sub-pixels 100 in the direction perpendicular to the scan line direction (Y direction) being "b" (in this example, b=4).

In this example, an image-to-be-rendered (not shown) has a region including the edge line L and the lower side 16 of the pixel group 1 (failing to include the upper side 17). In other words, the area to be calculated essentially is the area of the region of each pixel 10, the region including the edge line L and the lower side 16 of the pixel group 1 (failing to include the upper side 17). In other words, the area to be calculated essentially is an area of a region of each pixel 10, the region being covered by a right triangle, the right triangle including the image-to-be-rendered, the edge line L from the first point P1 to the second point P2 as a hypotenuse, and the lower side 16 or the upper side 17 (in this example, the lower side 16) of the pixel group 1 as a cathetus.

In order to calculate an area of a region of each pixel 10, the region being covered by the right triangle including the edge line L from the first point P1 to the second point P2 as a hypotenuse, it is necessary to calculate the x-real number coordinate ($x_0$) of the first point P1 and the x-real number coordinate ($x_1$) of the second point P2. However, it takes long processing time to calculate the x-real number coordinate ($x_0$) of the first point P1 and the x-real number coordinate ($x_1$) of the second point P2. In view of this, the x-real number coordinate ($x_0$) of the first point P1 and the x-real number coordinate ($x_1$) of the second point P2 are rounded into integer coordinates of the sub-pixel system, respectively. Specifically, a rounding method is as follows.

The first sub-pixel 101 includes the first point P1. The first vertex P3, which is one of the two vertices of the first sub-pixel 101 positioned on the lower side 16, is selected. The real number coordinates of the first vertex P3 will be referred to as ($sbx_0$, $y_0$). Typically, a distance between the first point P1 and the first vertex P3 is smaller than a distance between the first point P1 and the other vertex out of the two vertices of the first sub-pixel 101 positioned on the lower side 16. As a result, an area is further approximated to the real area. The first point P1 is rounded into the first vertex P3.

The second sub-pixel 102 includes the second point P2. The second vertex P4, which is one of the two vertices of the second sub-pixel 102 positioned on the upper side 17, is selected. The real number coordinates of the second vertex P4 will be referred to as ($sbx_1$, $y_0+1$). Typically, a distance between the second point P2 and the second vertex P4 is smaller than a distance between the second point P2 and the other vertex out of the two vertices of the second sub-pixel 102 positioned on the upper side 17. As a result, an area is further approximated to the real area. The second point P2 is rounded into the second vertex P4.

As described above, the area to be calculated essentially is an area of a region of each pixel 10, the region being covered by a right triangle, the right triangle including the image-to-be-rendered, the edge line L from the first point P1 to the second point P2 as a hypotenuse, and the lower side 16 or the upper side 17 (in this example, the lower side 16) of the pixel group 1 as a cathetus.

However, instead of the real right triangle, the approximate right triangle T (hatching of FIG. 2) is created. The right triangle T includes the image-to-be-rendered, the line segment L1 from the first vertex P3 to the second vertex P4 (solid line of FIG. 2) as a hypotenuse, and the lower side 16 or the upper side 17 (in this example, the lower side 16) of the pixel group 1 as a cathetus (referred to as first cathetus). Then, an area of a region of each pixel 10 is calculated, the region being covered by the right triangle T including the image-to-be-rendered, the line segment L1 from the first vertex P3 to the second vertex P4 as a hypotenuse, and the lower side 16 or the upper side 17 (in this example, the lower side 16) of the pixel group 1 as the first cathetus.

4. Detailed Method of Calculating an Area of an Image that Covers a Pixel

A method of calculating an area of a region of each pixel 10, the region being covered by the right triangle T, will be described more specifically below.

The first micro-triangle MT1 is included in the first sub-pixel 101 or the second sub-pixel 102 (in this example, the first sub-pixel 101). The first micro-triangle MT1 includes the image-to-be-rendered, the line segment L1 as the hypotenuse, the lower side 16 or the upper side 17 (in this example, the lower side 16) that is the first cathetus of the right triangle T as a cathetus, and one side of the first sub-pixel 101 or the second sub-pixel 102 (in this example, the first sub-pixel 101) as another cathetus. The first micro-triangle MT1 and the right triangle T have a geometrical similarity. The bottom side (the lower side 16) of the first micro-triangle MT1 in the sub-pixel system has the length=1. The first micro-triangle MT1 has the area=s.

If the area (s) of the first micro-triangle MT1 is calculated and then if the number of the multiple micro-triangles MT (which are included in a region of each pixel 10, the region being covered by the right triangle T, each micro-triangle MT and the first micro-triangle MT1 being congruent) is obtained, then it is possible to calculate an area of a region of each pixel 10, the region being covered by the right triangle T. In other words, a region of each pixel 10, the region being covered by the right triangle T, has an area=(the area (s) of the first micro-triangle MT1)×(the number of the micro-triangles MT).

The number of the multiple micro-triangles MT in the perpendicular direction (Y direction) can be calculated on a basis of arithmetic progression (i.e., odd number sequence where the initial term=1) where the initial term=1, the common difference=2, and the number of terms=the number of the multiple sub-pixels 100 that form the first cathetus (the lower side 16) of the right triangle T.

In this example, 1=the number of the micro-triangle (first micro-triangle) MT included in the first sub-pixel 101. 3=the number of the micro-triangles MT included in the sub-pixel 100, which is the first sub-pixel from the first sub-pixel 101 in the scan line direction (X direction). 5=the number of the micro-triangles MT included in the sub-pixel 100, which is the second sub-pixel from the first sub-pixel 101 in the scan line direction (X direction). 7=the number of the micro-triangles MT included in the sub-pixel 100 (see auxiliary lines of FIG. 2), which is the third sub-pixel from the first sub-pixel 101 in the scan line direction (X direction). A method of calculating an area of a region of each pixel 10, the region being covered by the right triangle T, will be described further more specifically below.

As described above, in the sub-pixel system, each micro-triangle MT and the right triangle T have geometrical similarity. The real number coordinates of the first vertex P3 of the right triangle T are ($sbx_0$, $y_0$), and the real number coordinates of the second vertex P4 are ($sbx_1$, $y_0+1$). Therefore the area s of the micro-triangle MT is calculated on a basis of the area of the right triangle T by using a proportional equation of Math 1. In Math 1, b is the number of the multiple sub-pixels 100 arrayed in the direction (Y direction) perpendicular to the scan line direction.

$$s = \frac{b}{2(sbx_1 - sbx_0)} \quad \text{[Math 1]}$$

Meanwhile, the number num of the multiple micro-triangles MT is calculated by using Math 2, the multiple micro-triangles MT being included in the multiple sub-pixels 100 arranged in matrix from the (m+1)-th sub-pixel 100 to the n-th sub-pixel 100 (m<n, where m and n are positive integers) in the Y direction, with reference to the x-real number coordinate ($sbx_0$) in the sub-pixel system.

$$\text{num} = n^2 - m^2 \quad \text{[Math 2]}$$

Meanwhile, as described above, the number of the multiple micro-triangles MT in the perpendicular direction (Y direction) can be calculated on a basis of arithmetic progression (i.e., odd number sequence where the initial term=1) where the initial term=1, the common difference=2, and the number of terms=the number of the multiple sub-pixels 100 that form the first cathetus (the lower side 16) of the right triangle T.

As a result, the number of the micro-triangles MT from the micro-triangle MT including the x-real number coordinate ($sbx_0$) to the k-th micro-triangle MT (k is an arbitrary value) in the Y direction with reference to the x-real number coordinate ($sbx_0$) in the sub-pixel system is calculated by using Math 3.

$$\sum_{i=1}^{k} (2i - 1) = k^2 \quad \text{[Math 3]}$$

If δ=n−m (m<n), then m=n−δ. Then, the number of the multiple micro-triangles MT (which is calculated by using Math 2) is converted into Math 4, the multiple micro-triangles MT being included in the multiple sub-pixels 100 arranged in matrix from the (m+1)-th sub-pixel 100 to the n-th sub-pixel 100 (m<n, where m and n are positive integers) in the Y direction.

$$n^2 - m^2 = n^2 - (n - \delta)^2 = n^2 - (n^2 - 2n\delta + \delta^2) = 2n\delta - \delta^2 \quad \text{[Math 4]}$$

As a result, in the sub-pixel system, the total area $c_i$ of the multiple micro-triangles MT is calculated by using Math 5, the multiple micro-triangles MT being included in the multiple sub-pixels 100 arranged in matrix from the (m+1)-th sub-pixel 100 to the n-th sub-pixel 100 (m<n, where m and n are positive integers) in the Y direction. In other words, in Math 5, the total area $c_i$ is obtained by multiplying the number of the micro-triangles MT ($n^2-m^2$ calculated by using Math 2, or $2n\delta - \delta^2$ calculated by using Math 4) by the areas of the micro-triangle MT.

$$c_i = (n^2 - m^2)s = (2n\delta - \delta^2)s \quad \text{[Math 5]}$$

In the pixel system, the area $C_i$ (0.0-1.0) (also referred to as coverage value) of the multiple micro-triangles MT included in each pixel 10 is calculated by using Math 6. Math 6 will be described. The sub-pixels 100 included in each pixel 10 from one end to the other end in the Y direction will be referred to as the sub-pixels 100 from the (m+1)-th sub-pixel 100 to the n-th sub-pixel 100. Then, the total area $c_i$ of the micro-triangles MT included in all the sub-pixels 100 included in one pixel 10 is divided by the area (vertical× lateral=ab) of all the sub-pixels 100 included in one pixel 10. As a result, the total area $C_i$ of the micro-triangles MT included in one pixel 10 is calculated. Note that (0.0) means lightness 0%, and (1.0) means lightness 100%.

$$C_i = \frac{c_i}{ab} = \frac{2n\delta - \delta^2}{ab} s \quad \text{[Math 6]}$$

By the way, in actual implementation, in many cases, the 1 pixel area is expressed by 1 byte data (0 to 255). Therefore, if the area $C_i$ of the multiple micro-triangles MT included in each pixel 10 is expressed by a byte data value (0 to 255), the actual occupied area $BC_i$ is calculated by using Math 7.

$$BC_i = 255 \cdot C_i = 255 \cdot \frac{(2n\delta - \delta^2)}{ab} s \quad \text{[Math 7]}$$

5. Specific Example of a Method of Calculating an Area of an Image that Covers a Pixel A specific example of a method of calculating an area of a region of each pixel 10, the region being covered by the right triangle T, will be described below.

In this example, a=4 (the number of the multiple sub-pixels 100 included in one pixel 10 in the X direction), b=4 (the number of the multiple sub-pixels 100 included in one pixel 10 in the Y direction), and $sbx_1 - sbx_0 = 13$ (the number of the multiple sub-pixels 100 from the second vertex P4 to the first vertex P3 in the X direction). In this case, those values are substituted into Math 1. As a result, the area s of the micro-triangle MT is calculated. As shown in Math 8, the area s has the byte data value (2/13).

$$s = \frac{b}{2(sbx_1 - sbx_0)} = \frac{4}{2 \times 13} = 2/13 \quad \text{[Math 8]}$$

The area $C_1$ of the multiple micro-triangles MT, which is included in the pixel (also referred to as primary pixel) 10A including the first vertex P3 ($sbx_0, y_0$), is calculated by using Math 9. The area $C_1$ of the multiple micro-triangles MT included in the primary pixel 10A is the area $C_1$ of the multiple micro-triangles MT from the 1st (=(m+1)-th) micro-triangle MT to the 3rd (=n-th) micro-triangles MT in the Y direction in the primary pixel 10A. Therefore n=3 and δ=3 (because m=0). Further, s=2/13. Those values are substituted into Math 6. As a result, the area $C_1$ of the multiple micro-triangles MT included in the primary pixel 10A is calculated. As shown in Math 9, $C_1$=0.0865.

$$C_1 = \frac{2n\delta - \delta^2}{ab} s = \frac{2 \times 3 \times 3 - 3^2}{4 \times 4} \times \frac{2}{13} = 0.0865 \quad \text{[Math 9]}$$

0.0865=the area $C_1$ of the multiple micro-triangles MT included in the primary pixel 10A. The area $C_1$ is expressed by the byte data value (0 to 255). $C_1$=0.0865, which is calculated by using Math 9, is substituted into Math 7. As a result, the byte data value $BC_1$ of the area $C_1$ of the multiple micro-triangles MT included in the primary pixel 10A is calculated. As shown in Math 10, $BC_1$=22.

$$BC_1 = 255 \cdot C_1 = 255 \cdot \frac{(2n\delta - \delta^2)s}{ab} = 255 * 0.0865 \approx 22 \quad \text{[Math 10]}$$

With regard to each pixel 10B, 10C, or 10D, n and δ are substituted into Math 6. As a result, by using Math 9, the area $C_i$ of the multiple micro-triangles MT included in each pixel 10B, 10C, or 10D is calculated. Further, $C_i$ calculated by using Math 9 is substituted into Math 7. As a result, the byte data value $BC_i$ of the area $C_i$ of the multiple micro-triangles MT included in each pixel 10B, 10C, or 10D is calculated by using Math 10.

FIG. 3 shows the area $C_i$ of the multiple micro-triangles MT included in each pixel 10A, 10B, 10C, or 10D, and the byte data value $BC_i$ thereof.

The area $C_2$ of the multiple micro-triangles MT included in the pixel 10B (also referred to as middle pixel) adjacent to the primary pixel 10A is the area $C_2$ of the multiple micro-triangles MT from the 4th (=(m+1)-th) micro-triangles MT to the 7th (=n-th) micro-triangles MT in the middle pixel 10B in the Y direction. Therefore n=7 and δ=4 (because m=3). Further, s=2/13. Those values are substituted into Math 6. As a result, the area $C_2$ of the multiple micro-triangles MT included in the middle pixel 10B is calculated. As shown in FIG. 3, $C_2$=0.385. $C_2$=0.385 is substituted into Math 7. As a result, the byte data value $BC_2$ of the area $C_2$ of the multiple micro-triangles MT included in the middle pixel 10B is calculated. As shown in FIG. 3, $BC_2$=98.

The area $C_3$ of the multiple micro-triangles MT included in the pixel 10C (also referred to as middle pixel) adjacent to the middle pixel 10B is the area $C_3$ of the multiple micro-triangles MT from the 8th (=(m+1)-th) micro-triangles MT to the 11th (=n-th) micro-triangles MT in the middle pixel 10C in the Y direction. Therefore n=11 and δ=4 (because m=7). Further, s=2/13. Those values are substituted into Math 6. As a result, the area $C_3$ of the multiple micro-triangles MT included in the middle pixel 10C is calculated. As shown in FIG. 3, $C_3$=0.692. $C_3$=0.692 is substituted into Math 7. As a result, the byte data value $BC_3$ of the area $C_3$ of the multiple micro-triangles MT included in the middle pixel 10C is calculated. As shown in FIG. 3, $BC_3$=176.

The area $C_4$ of the multiple micro-triangles MT included in the pixel 10D (also referred to as end pixel) adjacent to the middle pixel 10C and including the second vertex P4 ($sbx_1$, $y_0$+1) is the area $C_4$ of the multiple micro-triangles MT from the 12th (=(m+1)-th) micro-triangles MT to the 13th (=n-th) micro-triangles MT in the end pixel 10D in the Y direction. Therefore n=13 and δ=2 (because m=11). Further, s=2/13. Those values are substituted into Math 6. As a result, the area $C_4$ of the multiple micro-triangles MT included in the end pixel 10D is calculated. As shown in FIG. 3, $C_4$=0.462. $C_4$=0.462 is substituted into Math 7. As a result, the byte data value $BC_4$ of the area $C_4$ of the multiple micro-triangles MT included in the end pixel 10D is calculated. As shown in FIG. 3, $BC_4$=117.

6. Actual Implementation Example

An actual implementation example of the aforementioned specific example for the image processing apparatus 20 will be described.

In an actual implementation example, a=b. The area $C_1$ (coverage value) of the multiple micro-triangles MT included in the primary pixel 10A is calculated by using Math 11. In Math 11, n=a−($sbx_0$ mod a) and n=δ.

$$C_1 = 255 \cdot \frac{n^2}{a^2} s = 255 \cdot \frac{n^2}{a^2} \cdot \frac{a}{2(sbx_1 - sbx_0)} = 255 \cdot \frac{n^2}{2a(sbx_1 - sbx_0)} \quad \text{[Math 11]}$$

Every pixel 10B or 10C except for the primary pixel 10A and the end pixel 10D has δ=a. Therefore the area $C_1$ (coverage value) of the multiple micro-triangles MT included in the pixel 10B or 10C except for the primary pixel 10A and the end pixel 10D is calculated by using Math 12.

$$C_i = 255 \cdot \frac{2an - a^2}{a^2} \cdot s = 255 \cdot \frac{2an - a^2}{a^2} \cdot \frac{a}{2(sbx_1 - sbx_0)} = 255 \cdot \frac{2n - a}{2(sbx_1 - sbx_0)} \quad \text{[Math 12]}$$

The difference between the n+a coverage value and the n coverage value, i.e., the coverage value differential amount Δ, is calculated by using Math 13.

$$\Delta = 255 \cdot \frac{(2(n+a) - a) - (2n - a)}{2(sbx_1 - sbx_0)} = 255 \cdot \frac{a}{sbx_1 - sbx_0} \quad \text{[Math 13]}$$

Therefore the area $C_1$ (coverage value) of the multiple micro-triangles MT included in the pixel 10B or 10C except for the primary pixel 10A and the end pixel 10D is calculated by using the addition processing of Math 14 at any time.

$$C_{i+1} = C_i + \Delta \quad \text{[Math 14]}$$

Actual implementation is executed by using fixed-point arithmetic where a is powers of 2 (4, 8, 16 . . . ). As a result, as shown in Math 15 and Math 16, a-fold is converted into the $\log_2$ a shift operation. As a result, high-speed operation processing is realized.

$$ax = z << \log_2 a = x << k \ (a = 2, 4, 8, \ldots, 2^k) \quad \text{[Math 15]}$$

$$255 \cdot x = (256 - 1)x = 256x - x = (x << 8) - x \quad \text{[Math 16]}$$

7. Code Example and Operational Flow

Next, an actual implementation example will be described. In an actual implementation example, the image processing apparatus 20 executes an image processing program to thereby realize the aforementioned actual implementation example (addition processing).

In the controller circuit 200 of the image processing apparatus 20, the CPU 21 loads an image processing program stored in the ROM 22 in the RAM 23 and executes the image processing program to thereby calculate an area of an image that covers a pixel by using the following method.

Figure 5:
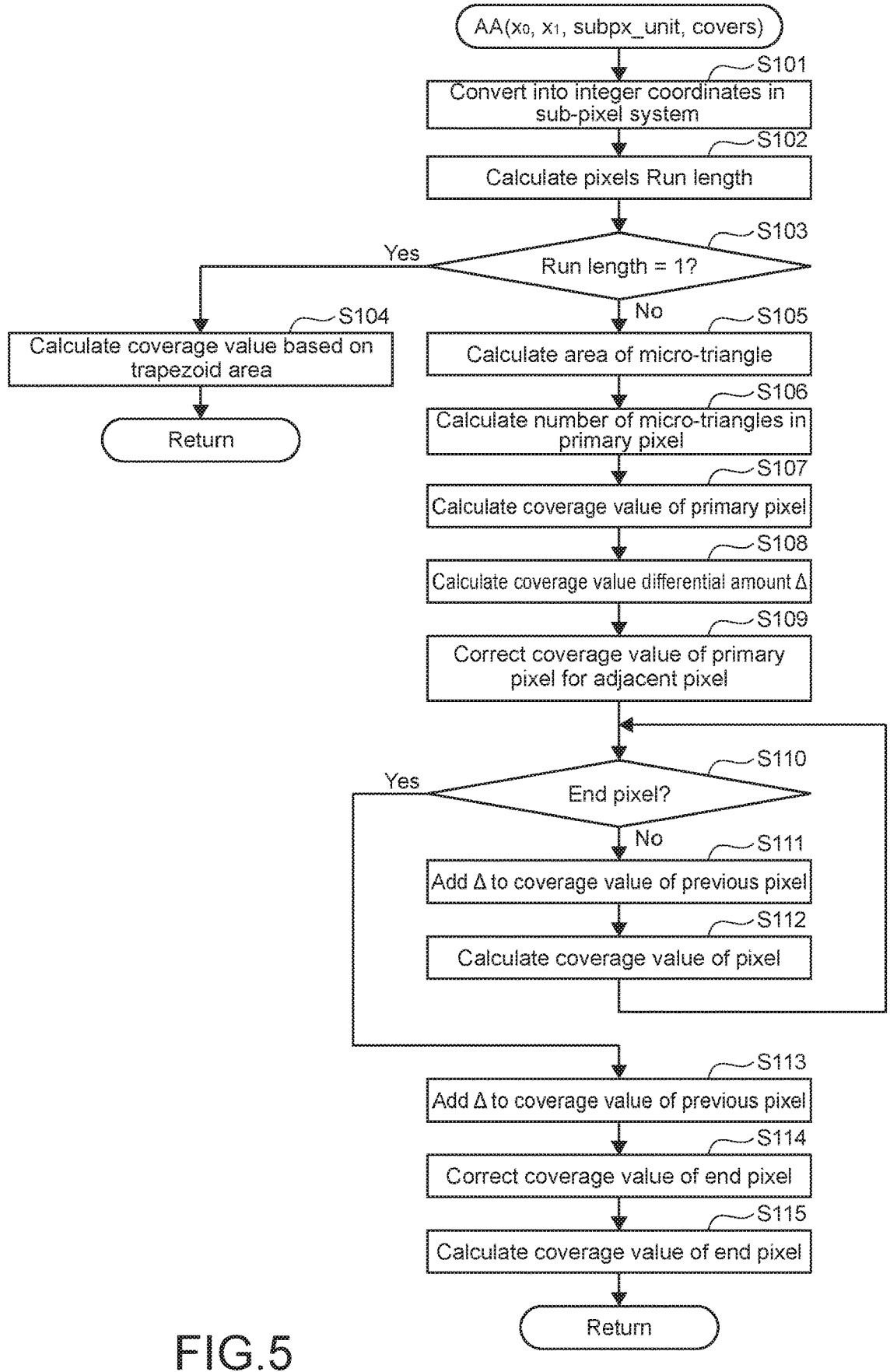
FIG. 5 shows an operational flow in which the image processing apparatus executes the code of FIG. 4.
Figure 6:
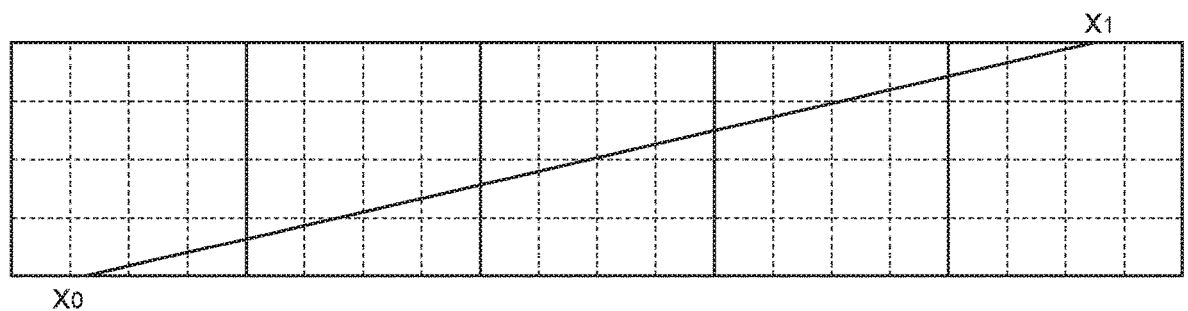
FIG. 6 schematically illustrates the operation of the image processing apparatus.

FIG. 4 shows a code example of fixed-point arithmetic actual implementation as an actual implementation example. FIG. 5 shows an operational flow in which the image processing apparatus executes the code of FIG. 4. Each of FIG. 6 to FIG. 17 schematically illustrates the operation of the image processing apparatus.

Figure 7:
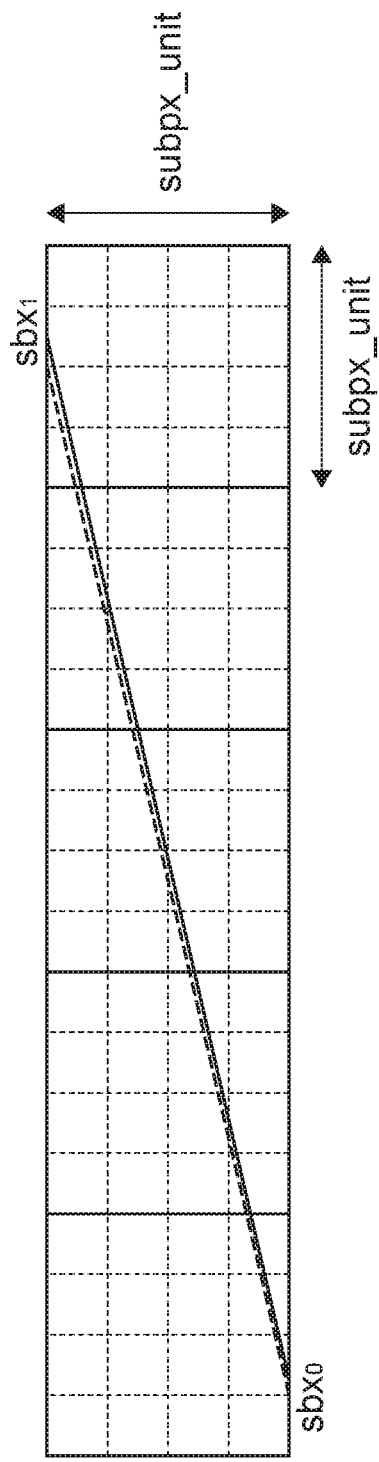
FIG. 7 schematically illustrates the operation of the image processing apparatus.
Figure 8:
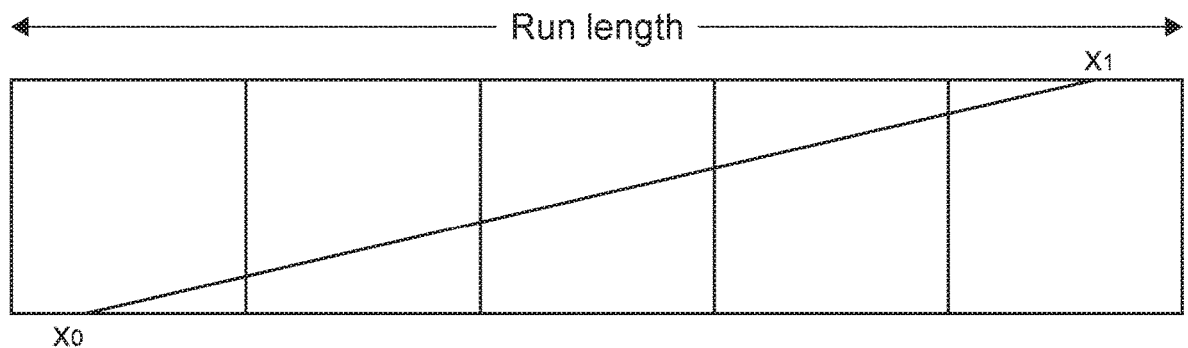
FIG. 8 schematically illustrates the operation of the image processing apparatus.
Figure 9:
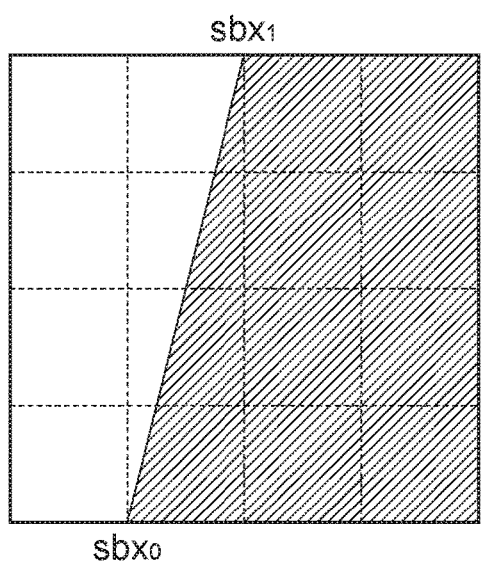
FIG. 9 schematically illustrates the operation of the image processing apparatus.
Figure 10:
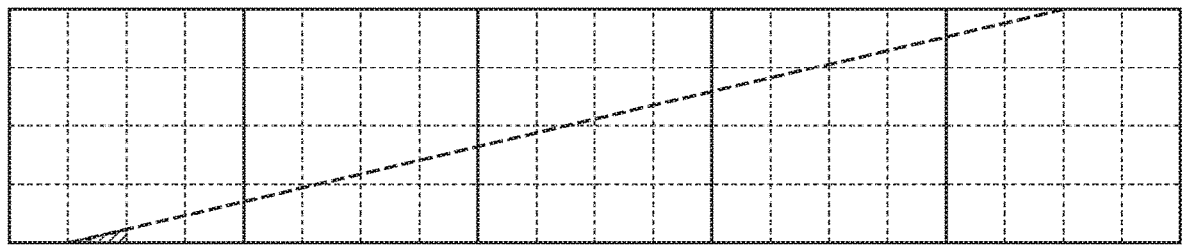
FIG. 10 schematically illustrates the operation of the image processing apparatus.
Figure 11:
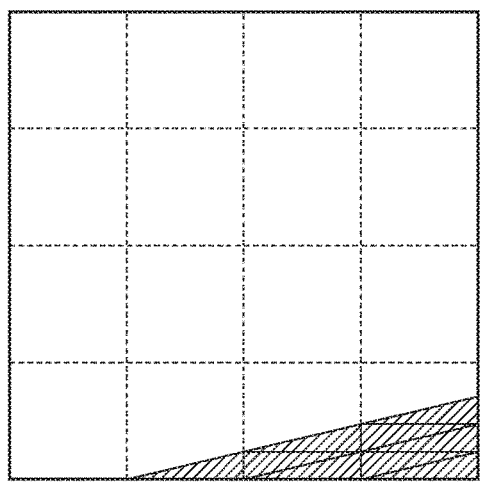
FIG. 11 schematically illustrates the operation of the image processing apparatus.
Figure 12:
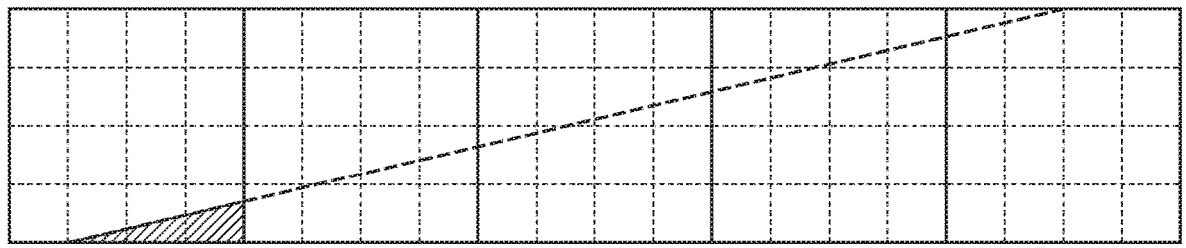
FIG. 12 schematically illustrates the operation of the image processing apparatus.
Figure 13:
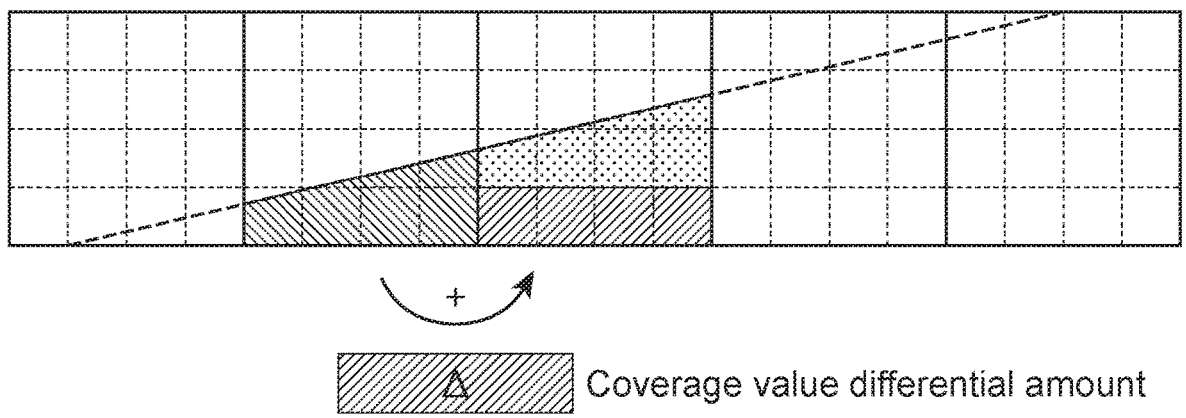
FIG. 13 schematically illustrates the operation of the image processing apparatus.

The controller circuit 200 converts the first point P1 ($x_0$, $y_0$) and the second point P2 ($x_1$, $y_0$+1) (FIG. 6) into the integer coordinates in the sub-pixel system. Specifically, the controller circuit 200 selects the first vertex P3 (sbx$_0$, y$_0$), which is positioned on the lower side 16 of the first sub-pixel 101 including the first point P1 (x$_0$, y$_0$) (FIG. 7). The controller circuit 200 selects the second vertex P4 (sbx$_1$, y$_0$+1), which is positioned on the upper side 17 of the sub-pixel 102 including the second point P2 (x$_1$, y$_0$+1) (FIG. 7). The controller circuit 200 creates the right triangle T. The right triangle T includes the image-to-be-rendered, the line segment from the first vertex P3 to the second vertex P4 as a hypotenuse, and the lower side 16 or the upper side 17 (in this example, the lower side 16) of the pixel group 1 as a cathetus (Step S101).

The controller circuit 200 calculates the number of the pixels 10 (also referred to as Run length) from the pixel 10 including the first point P1 (x$_0$, y$_0$) to the pixel 10 including the second point P2 (x$_1$, y$_0$+1) (FIG. 8) (Step S102). The controller circuit 200 determines whether or not Run length=1 (Step S103).

If the controller circuit 200 determines that Run length=1 (i.e., one pixel 10 is included in the pixel group 1) (Step S103, Yes), the controller circuit 200 does not execute the arithmetic processing using micro-triangles, but calculates an area of a trapezoid (FIG. 9) (Step S104).

Meanwhile, if the controller circuit 200 determines that Run length is not 1 (i.e., multiple pixels 10 are included in the pixel group 1) (Step S103, No), the controller circuit 200 calculates an area of a micro-triangle MT (FIG. 10) (Step S105).

The controller circuit 200 calculates the number of the multiple micro-triangles MT (FIG. 11) included in the primary pixel 10A including the first vertex P3 (sbx$_0$, y$_0$) (Step S106). The controller circuit 200 calculates the coverage value C$_i$ (FIG. 12) of the primary pixel 10A by using Math 11 (Step S107) on a basis of the area of the micro-triangle MT (Step S105) and the number of the multiple micro-triangles MT included in the primary pixel 10A (Step S106).

The controller circuit 200 calculates the coverage value C$_i$ of the middle pixel 10B adjacent to the primary pixel 10A and the coverage value C$_i$ of the middle pixel 10C adjacent to the middle pixel 10B on by using Math 12. The controller circuit 200 calculates the difference between the coverage value C$_i$ of the middle pixel 10B and the coverage value C$_i$ of the middle pixel 10C, i.e., the coverage value differential amount Δ (FIG. 13) by using Math 13 (Step S108).

Figure 14:
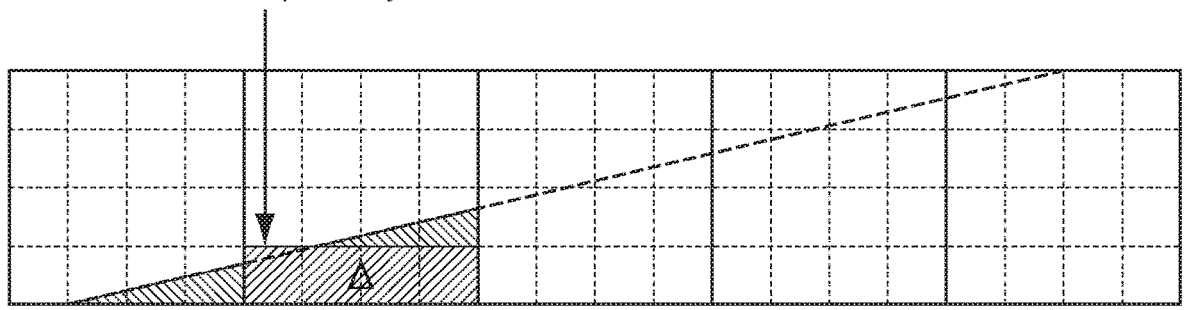
FIG. 14 schematically illustrates the operation of the image processing apparatus.
Figure 15:
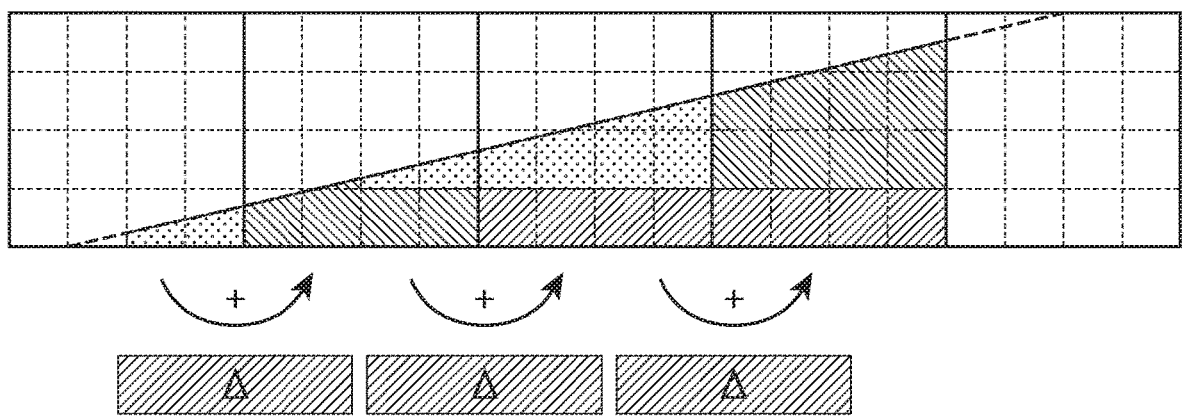
FIG. 15 schematically illustrates the operation of the image processing apparatus.
Figure 16:
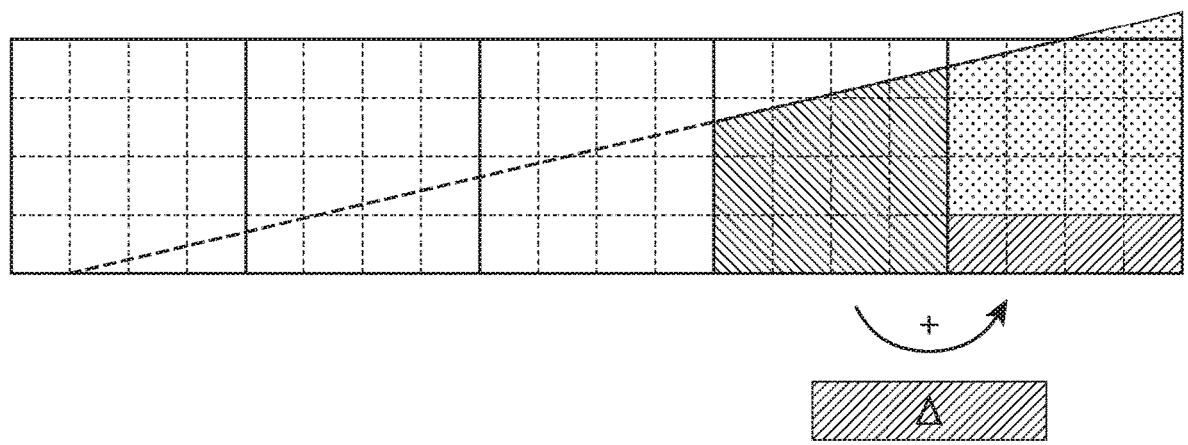
FIG. 16 schematically illustrates the operation of the image processing apparatus.

By the way, let's say that the coverage value differential amount Δ is added to the coverage value C$_i$ of the primary pixel 10A, and the coverage value C$_i$ of the middle pixel 10B adjacent to the primary pixel 10A is thereby calculated. However, if the coverage value differential amount Δ is added to the coverage value C$_i$ of the primary pixel 10A, the obtained value is larger than the coverage value C$_i$ of the adjacent middle pixel 10B, actually (FIG. 14). In view of this situation, the controller circuit 200 corrects the coverage value C$_i$ of the primary pixel 10A in order to calculate the coverage value C$_i$ of the middle pixel 10B adjacent to the primary pixel 10A accurately (Step S109). Logically speaking, the coverage value C$_i$ of the primary pixel 10A is corrected by using "the coverage value C$_i$ of the primary pixel 10A−(the coverage value C$_i$ of the primary pixel 10A+the coverage value differential amount Δ−the coverage value C$_i$ of the middle pixel 10B)". In actual implementation, the coverage value C$_i$ of the primary pixel 10A is corrected by using "the coverage value C$_i$ of the primary pixel 10A−(the number of sub-pixels arrayed in the X direction included in one pixel−m)$^2$×the area of the micro-triangle MT". In this case, "(the number of sub-pixels arrayed in the X direction included in one pixel−m)$^2$" is the number of the micro-triangles MT included in the portion other than the coverage value C$_i$ of the middle pixel 10B (FIG. 14).

With regard to the middle pixel 10B or 10C except for the primary pixel 10A and the end pixel 10D (Step S110, No), the controller circuit 200 adds the coverage value differential amount Δ to the coverage value C$_i$ of the previous pixel 10 (Step S111) to thereby calculate the coverage value C$_i$ of the present pixel 10 (FIG. 15) (Step S112).

Figure 17:
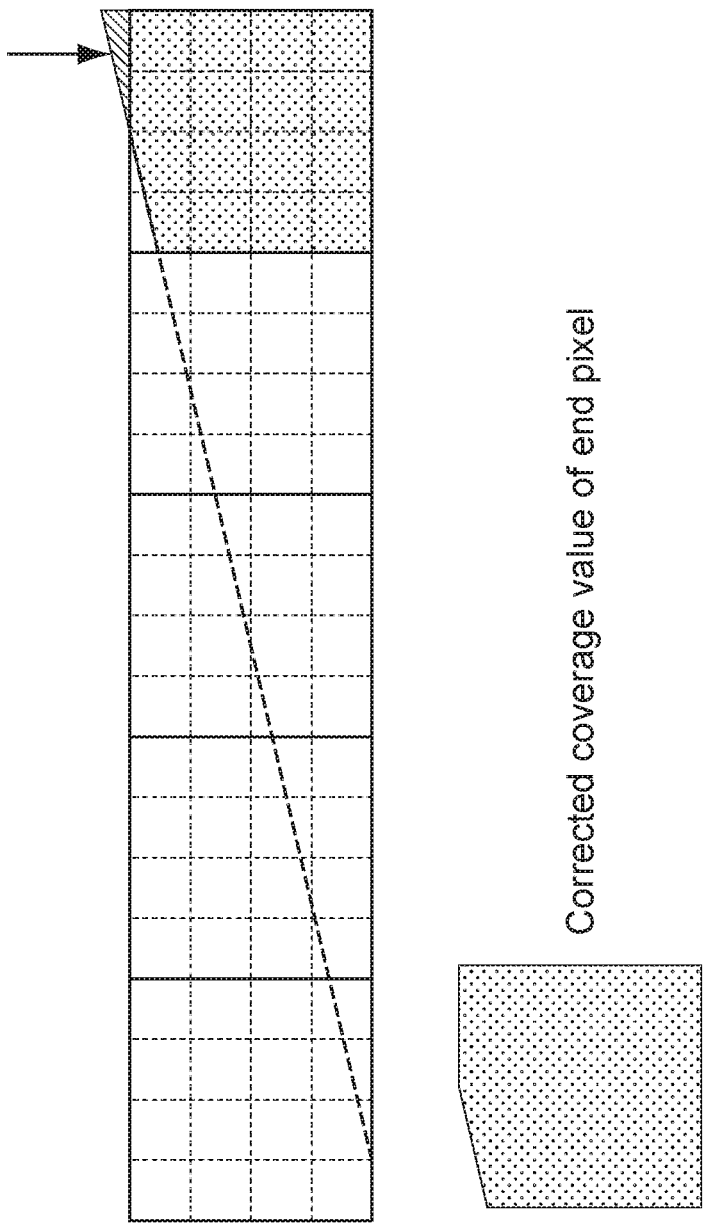
FIG. 17 schematically illustrates the operation of the image processing apparatus.

By the way, the coverage value differential amount Δ is added to the coverage value C$_i$ of the middle pixel 10C, and the coverage value C$_i$ of the end pixel 10D adjacent to the middle pixel 10C is thereby calculated (Step S113). However, if the coverage value differential amount Δ is added to the coverage value C$_i$ of the middle pixel 10C (FIG. 16), the obtained value is larger than the coverage value C$_i$ of the end pixel 10D, actually (FIG. 17). In view of this situation, the controller circuit 200 corrects the coverage value C$_i$ of the end pixel 10D in order to calculate the coverage value C$_i$ of the end pixel 10D adjacent to the middle pixel 10C accurately (Step S114). The coverage value C$_i$ of the end pixel 10D is thereby calculated (Step S115). In actual implementation, the coverage value C$_i$ of the end pixel 10D is corrected by using "the coverage value C$_i$ of the end pixel 10D−(the number of sub-pixels arrayed in the X direction included in one pixel−n)$^2$×the area of the micro-triangle MT". In this case, "(the number of sub-pixels arrayed in the X direction included in one pixel−m)$^2$" is the number of the micro-triangles MT included in the portion other than the coverage value C$_i$ of the end pixel 10D (FIG. 17).

8. Conclusion

Typically, in anti-aliasing of scan line conversion, sub-pixels in a virtual system is multi-scanned, an average of results is obtained, and an area is thereby approximated. Meanwhile, in order to improve accuracy of arithmetic processing to make an approximate area closer to an actual area, it is necessary to increase the number of divided sub-pixels. However, if the number of divided sub-pixels is increased, then the number of times of scanning is increased. In addition, a load is applied to calculation of an average value. As a result, if accuracy of arithmetic processing is increased, then performance is rather decreased.

According to a conceivable method of calculating a coverage value of a pixel, starting from a coverage value (area) of a primary pixel, a differential amount for calculating a coverage value (area) of a next pixel is added successively. However, in the method of adding a differential amount successively, it is necessary to prevent a cumulative error from occurring. In order to prevent a cumulative error from occurring, it is necessary to prepare the number of significant digits with a high degree of accuracy. Therefore it is necessary to implement hardware.

To the contrary, according to the present embodiment, the image processing apparatus is configured to create a right triangle T, the right triangle T having a hypotenuse being a line segment from the rounded first vertex P3 to the rounded second vertex P4, calculate an area of a first micro-triangle, the first micro-triangle MT1 being included in one sub-pixel 100, the first micro-triangle MT1 and the right triangle T having a geometrical similarity, calculate a number of multiple micro-triangles MT included in a region of each pixel 10 of the multiple pixels 10, the region being covered by the right triangle 10, each micro-triangle MT of the multiple micro-triangles MT and the first micro-triangle MT1 being congruent, and calculate an area $C_i$ of the region of each pixel 10 of the multiple pixels 10, the region being covered by the right triangle T, on a basis of the number of the multiple micro-triangles MT and the area of the first micro-triangle MT1.

According to this method, only if the number of the multiple micro-triangles MT included in the multiple pixels 10 and the area $c_i$ of the first micro-triangle MT1 are calculated, it is possible to calculate the area $C_i$ of each pixel 10. As a result, high-speed arithmetic processing may be realized. Further, even if the number of divided sub-pixels is increased, the arithmetic processing speed may not be decreased since the same calculation method is applicable. Further, software implementation is acceptable.

The controller circuit 200 is capable of calculating a number of the multiple micro-triangles MT in the perpendicular direction on a basis of an arithmetic progression where an initial term=1, a common difference=2, and a number of terms=a number of the multiple sub-pixels 100 that form the first cathetus of the right triangle T.

Therefore it is possible to calculate the number of the micro-triangles MT easily.

In an actual implementation example, the controller circuit 200 is configured to determine a value obtained by addition using a differential amount Δ between areas $C_i$ (coverage value) of the regions of two adjacent middle pixels 10B and 10C, each region of the regions being covered by the right triangle T, and an area $C_i$ (coverage value) of the region of the primary pixel 10A, the region being covered by the right triangle T, as the area $C_i$ (coverage value) of the region of each middle pixel 10B or 10C of the multiple middle pixels, the region being covered by the right triangle T.

As a result, it is possible to easily calculate the area $C_i$ (coverage value) of the region of the middle pixel 10B or 10C, the region being covered by the right triangle T.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a controller circuit configured to
detect a first point in a pixel group, the pixel group including multiple rectangular pixels arrayed in one line in series in a scan line direction, each pixel of the multiple pixels being divided into multiple rectangular sub-pixels, the multiple rectangular sub-pixels being arranged in a matrix in the scan line direction and in a perpendicular direction, the perpendicular direction being a direction perpendicular to the scan line direction, a lower side and an upper side of the pixel group being in parallel with the scan line direction, the first point being a point on which the lower side of the pixel group and an edge line cross each other, the edge line being a line indicating an edge of an image-to-be-rendered,
detect a second point, the second point being a point on which the upper side of the pixel group and the edge line cross each other,
select a first vertex, the first vertex being one vertex of two vertices positioned on a lower side of a first sub-pixel, the first sub-pixel being a sub-pixel including the first point out of the multiple sub-pixels,
select a second vertex, the second vertex being one vertex of two vertices positioned on an upper side of a second sub-pixel, the second sub-pixel being a sub-pixel including the second point out of the multiple sub-pixels,
create a right triangle, the right triangle including the image, the right triangle having a hypotenuse and a first cathetus, the hypotenuse being a line segment from the first vertex to the second vertex, the first cathetus being the upper side or the lower side of the pixel group,
calculate an area of a first micro-triangle, the first micro-triangle being included in the first sub-pixel or the second sub-pixel, the first micro-triangle including the image, the image having a hypotenuse, one cathetus, and one other cathetus, the hypotenuse being the line segment, the one cathetus being the first cathetus of the right triangle, the one other cathetus being one side of the first sub-pixel or the second sub-pixel, the first micro-triangle and the right triangle having a geometrical similarity,
calculate a number of multiple micro-triangles included in a region of each pixel of the multiple pixels, the region being covered by the right triangle, each micro-triangle of the multiple micro-triangles and the first micro-triangle being congruent, and
calculate an area of the region of each pixel of the multiple pixels, the region being covered by the right triangle, on a basis of the number of the multiple micro-triangles and the area of the first micro-triangle.

2. The image processing apparatus according to claim 1, wherein
the controller circuit is further configured to
calculate a number of the multiple micro-triangles in the perpendicular direction on a basis of an arithmetic progression where an initial term=1, a common difference=2, and a number of terms=a number of the multiple sub-pixels that form the first cathetus of the right triangle,
calculate the number of the micro-triangles included in the region of each pixel of the multiple pixels, the region being covered by the right triangle, on a basis of the number of the multiple micro-triangles in the perpendicular direction, and
multiply the number of the micro-triangles calculated by the area of the first micro-triangle, and determine an obtained value as the area of the region of each pixel of the multiple pixels, the region being covered by the right triangle.

3. The image processing apparatus according to claim 1, wherein
the pixel group includes
a primary pixel, the primary pixel being a pixel including the first micro-triangle,
an end pixel, the end pixel being a pixel at an opposite end of the right triangle opposite to the primary pixel, and
multiple middle pixels other than the primary pixel and the end pixel, and
the controller circuit is further configured to determine a value obtained by addition using a differential amount between areas of the regions of two adjacent middle pixels, each region of the regions being covered by the right triangle, and an area of the region of the primary pixel, the region being covered by the right triangle, as the area of the region of each middle pixel of the multiple middle pixels, the region being covered by the right triangle.

4. The image processing apparatus according to claim 1, wherein
the controller circuit is further configured to
select a vertex from the two vertices positioned at the lower side of the first sub-pixel as the first vertex, a distance between the first point and the first vertex being smaller than a distance between the first point and a vertex not selected as the first vertex, and
select a vertex from the two vertices positioned at the upper side of the second sub-pixel as the second vertex, a distance between the second point and the second vertex being smaller than a distance between the second point and a vertex not selected as the second vertex.

5. A non-transitory computer readable recording medium that stores an image processing program, the image processing program causing a controller circuit of an image processing apparatus to:
detect a first point in a pixel group, the pixel group including multiple rectangular pixels arrayed in one line in series in a scan line direction, each pixel of the multiple pixels being divided into multiple rectangular sub-pixels, the multiple rectangular sub-pixels being arranged in a matrix in the scan line direction and in a perpendicular direction, the perpendicular direction being a direction perpendicular to the scan line direction, a lower side and an upper side of the pixel group being in parallel with the scan line direction, the first point being a point on which the lower side of the pixel group and an edge line cross each other, the edge line being a line indicating an edge of an image-to-be-rendered;
detect a second point, the second point being a point on which the upper side of the pixel group and the edge line cross each other;
select a first vertex, the first vertex being one vertex of two vertices positioned on a lower side of a first sub-pixel, the first sub-pixel being a sub-pixel including the first point out of the multiple sub-pixels;
select a second vertex, the second vertex being one vertex of two vertices positioned on an upper side of a second sub-pixel, the second sub-pixel being a sub-pixel including the second point out of the multiple sub-pixels;
create a right triangle, the right triangle including the image, the right triangle having a hypotenuse and a first cathetus, the hypotenuse being a line segment from the first vertex to the second vertex, the first cathetus being the upper side or the lower side of the pixel group;
calculate an area of a first micro-triangle, the first micro-triangle being included in the first sub-pixel or the second sub-pixel, the first micro-triangle including the image, the image having a hypotenuse, one cathetus, and one other cathetus, the hypotenuse being the line segment, the one cathetus being the first cathetus of the right triangle, the one other cathetus being one side of the first sub-pixel or the second sub-pixel, the first micro-triangle and the right triangle having a geometrical similarity;
calculate a number of multiple micro-triangles included in a region of each pixel of the multiple pixels, the region being covered by the right triangle, each micro-triangle of the multiple micro-triangles and the first micro-triangle being congruent; and
calculate an area of the region of each pixel of the multiple pixels, the region being covered by the right triangle, on a basis of the number of the multiple micro-triangles and the area of the first micro-triangle.

* * * * *